Patented Aug. 22, 1944

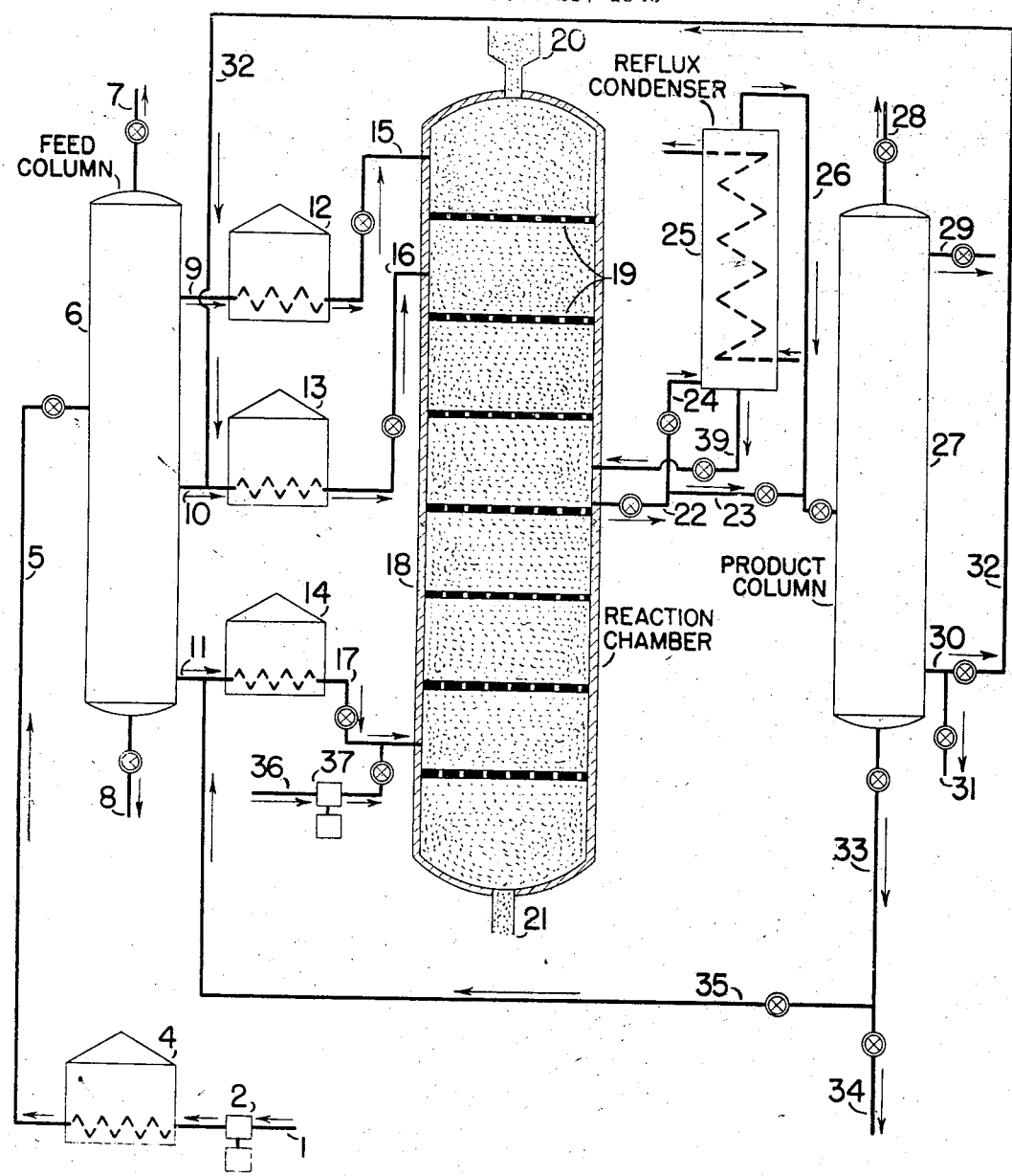

2,356,611

UNITED STATES PATENT OFFICE 2,356,611

PROCESS FOR CATALYTIC CONVERSION OF HYDROCARBONS

Kurt Peters, Ludwigshafen-on-the-Rhine, Germany; vested in the Alien Property Custodian Application November 28, 1940, Serial No. 367,670
In Germany November 18, 1939

6 Claims. (Cl. 196—52)

The present invention relates to a process for the cracking or destructive hydrogenation of hydrocarbons.

It is known, in the catalytic cracking or destructive hydrogenation of solid, liquid or gaseous hydrocarbons, to move the catalyst through the cracking space. On its way through the converter room, however, the catalyst loses efficiency unless this is counteracted by a proportionate rise of temperature. Such rise of temperature, however, not only is tedious to perform, but there is also the risk of harm being done to the materials to be operated upon as well as to the catalyst and for this reason it cannot be applied in many cases or only so to a limited extent.

I have now found that the cracking or destructive hydrogenation of hydrocarbon oils can be carried out with a uniformly high yield without a rise of temperature becoming necessary by moving the catalyst through the converter in an unusually large amount by volume, i. e. one that is at least equal to, but advantageously much larger than, the quantity (by volume) of the initial material passed through at the same time.

Due to the large proportion in which the catalyst is used compared with the initial material, the activity of the catalyst is so slightly impaired on its pass through the reaction chamber that it becomes neither necessary to raise the temperature during the reaction nor to add further quantities of catalyst to the oil which would involve intricate measures; moreover the catalyst can be reactivated in a very simple manner because it has taken up only small amounts of impurities.

As initial materials for the process according to the present invention I may mention mineral oils, tars or their distillation, extraction or destructive hydrogenation products as well as gaseous hydrocarbons. These are operated upon under ordinary or increased pressure and under conditions customary in cracking operations or subjected to a destructive, aromatizing or refining pressure hydrogenation. Again, for the isomerization of hydrocarbons or the conversion of the latter by means of gaseous hydrocarbons the process of the present invention may be employed. In each case, the temperature is chosen in dependency on the particular initial material used and on the reaction desired. As the efficiency of the catalyst is but slightly diminished during the reaction, this may generally be conducted throughout its entire duration at a lower than the usual temperature.

The catalysts employed for the process in accordance with the present invention are chosen from among those usually employed for cracking and destructive hydrogenation processes. As the efficiency of the catalyst is but slightly affected in the present process, it is possible to employ also such substances as only had a poor effect in the previous methods, as for example bleaching earths possessing little activity.

The catalyst and the initial material, as stated above, must be used in a ratio of at least 1:1, but employing the catalyst for example, two times, advantageously 4 to 50 times, or, most preferably, 5 to 25 times in excess of the quantity of the initial material has proved very useful for the purpose.

When practising the process according to my invention, the catalyst is moved through the reaction chamber by means of a suitable conveyor, for example screw conveyors of uniform or varying inclination, conveyor belts, shaking sieves, shaking chutes, revolving grates, wire plates or scoops or carriages which are moved through the reaction chamber or, the reaction chamber may be fitted with a system of sheet iron bottoms provided with perforations or slide-controlled slots which are displaced in every two successive bottoms, the catalyst falling through the reaction chamber successively from bottom to bottom. Rotary kilns or vertical ovens are also adapted for practising the process according to my invention.

The speed of flow at which the catalyst and the reaction material are moved through the converter depend on the type of reaction desired to be carried through and the initial material. It may be changed during the reaction, for example by altering the cross-section of the reaction chamber or by the addition of flushing gases, for example hydrogen, steam, nitrogen, carbon dioxide or water gas.

The catalyst and the initial material may flow in the same direction with, or in counter-current to, one another or meet one another in perpendicular direction. The initial materials may also be led in the same direction as, and in counter-current to, the catalyst both at a time; for this purpose, the fractions of the initial material which are difficult to crack and the catalyst, for example, are moved through the reaction vessel from one end, whereas the fractions which are more readily cracked are led together with a flushing gas in counter-current to the stream of the catalyst and the aforesaid fractions from the other end. The reaction products and gases are then withdrawn near the middle of the vessel.

With certain initial materials it may prove of advantage to split them up into several fractions prior to cracking them and feeding the single fractions to the reaction vessel, preferably in a preheated state, at different points according to the ease with which they undergo cracking.

The invention will be more clearly understood from the following description of a typical procedure, with particular reference to the annexed drawing, the single figure of which is a flow diagram of a conversion system according to the present invention.

The oil to be cracked is fed into line 1, pumped by pump 2 into heater 4 wherein it is vaporized and then passed through line 5 into feed column 6 from which gas is taken overhead through 7 and bottoms are withdrawn through 8. In column 6 the feed oil is separated into light-boiling constituents leaving column 6 through line 9, medium fractions leaving through line 10 and fractions of a maximum boiling oil leaving through line 11. The fractions withdrawn through lines 9, 10 and 11 are separately heated to cracking temperatures in heaters 12, 13 and 14, respectively, and thereafter passed through lines 15, 16 and 17, respectively, into different portions of catalyst chamber 18 provided with perforated sheet iron bottoms 19. Fresh catalyst is fed from hopper 20, moved downwardly through chamber 18 over the perforated bottoms 19 and withdrawn through 21 to be regenerated and recycled (not shown). Cracked products are withdrawn from chamber 18 through line 22 and passed either directly through line 23 or through line 24 and reflux condenser 25 into line 26 and product column 27 from which gas is withdrawn overhead through 28 and gasoline through 29 to storage (not shown). Middle oil withdrawn from column 27 through line 30 may either be passed through 31 to storage (not shown) or through line 32 into line 10 to be mixed therein with the medium fractions of the feed oil. Residue from product column 27 is withdrawn through 33 and either passed through 34 to storage (not shown) or recycled through line 35 into line 11 to be mixed therein with the feed oil fractions of maximum boiling point. In this manner, the light-boiling constituents of the oil to be cracked are introduced at one end of the reaction chamber 18 closely behind the place where the catalyst is supplied, while the medium fractions, if desired, together with the middle oil obtained from column 27, are introduced at a latter point, and both fractions are passed through chamber 18 concurrently with the downwardly moving catalyst until they leave chamber 18 at an intermediate point through line 22. The feed oil fractions of maximum boiling point, if desired, together with the highest fractions from product column 27 are mixed in line 17 with a flushing gas supplied through line 36, pump 37 and line 38, introduced near the lower end of the reaction chamber 18 and, guided by the flushing gas, passed in countercurrent to the catalyst to be withdrawn through line 22 together with the cracking products from the lighter constituents at an intermediate point of chamber 18. Reflux from reflux condenser 25 may be recycled through line 39 into chamber 18.

When practising the process in the above manner the heavy oil may also be cracked down to coke, in the presence of a catalyst which had been used for a longer period of time. For this purpose from the moving body of catalyst a part, for example about one twentieth to one hundredth, is branched off and conveyed to a space directly adjoining the cracking vessel in which space coking is effected. The bulk of the catalyst is returned to the reaction vessel after being regenerated, the part which has been branched off for coking being replaced by fresh catalyst. The gases formed in the coking operation may be used as flushing gases in the cracking process.

The space through which the catalyst is moved may be used not only for cracking, but also for distilling, dehydrating and refining the initial materials or the reaction products.

The apparatus used for carrying out the process according to my invention may also be subdivided into several chambers, each of which is provided with separate supply and discharge pipes for the initial materials and the reaction products, respectively. This subdivision makes it easier to carry each desired reaction through in a single zone of the reaction space in which the catalyst condition is best suited for the purpose. In addition, the said subdivision allows of a liquid and gaseous phase reaction to be carried out in the same equipment.

At the end of the reaction vessel means, for example sieves, may be provided for separating the catalyst into coarse-grained and fine-grained constituents. It is thus possible to separate the dust (with grain size up to about 1 millimeter) from the coarse grains which are to be regenerated.

The regeneration of the catalyst may be carried out in a simple manner, for example by oxidation or a treatment with hydrogen at a relatively low temperature. As there is but a slight amount of impurities deposited on the catalyst, the regeneration is done in a very short time. It may also be combined with the cracking process by passing the impaired catalyst to a regeneration zone following the cracking zone and effecting the regeneration by a treatment with air, steam or hydrogen. The gases leaving the regeneration zone can be used as flushing gases in the cracking process.

The following example serves to illustrate how the present invention may be carried out in practice, but the invention is not restricted to this example.

*Example*

A reaction oven being 10 meters high and having a capacity of 50 liters is fed per hour, at its bottom end, with the vapors of 50 liters of a middle oil derived from a German crude oil (boiling range from 200 to 325° C.), whereas 350 liters of bleaching earth (known under the trade designation "Terrana") are introduced at the top end in the form of small pills. The oil vapors are preheated to 360° C., while the catalyst is preheated to 480° C. By proper heating of the oven provision is made for the temperature of the oil vapors, on their way through the oven, to be raised from 360° to 480° C. The oven is kept constantly filled with catalyst. The reaction products leave near the point where the catalyst is introduced, whereas the spent catalyst is sluiced out near the point where the oil is fed. The liquid product obtained contains 60 per cent of gasoline boiling up to 200° C. and possessing an octane number of 78 (motor method).

What I claim is:

1. In a process for catalytically converting hydrocarbon oils at elevated temperatures using a catalyst moved through the reaction space in amounts by volume larger than the amount by volume of initial material passed through the reaction space at the same time, the improvement which comprises applying the catalyst in the form of a moving bed, separating the hydrocarbon oil feed stock into several fractions of different volatility, separately heating each fraction, leading the various fractions through the reaction space partly in countercurrent and partly in concurrent flow with respect to the moving catalyst bed, so that the relatively low boiling fractions and the catalyst bed are introduced close to the same end of the reaction space and moved in the same direction, while the relatively high boiling fractions are introduced together with a flushing gas close to the opposite end of the reaction space and led countercurrently to the stream of the catalyst and said low boiling fractions, and withdrawing the reaction products at an intermediate point of the reaction space.

2. A process according to claim 1 in which the amount by volume of catalyst passed through the reaction space is about 5 to 25 times the amount by volume of initial material passed at the same time through the reaction space.

3. In a process for catalytically cracking hydrocarbon oils at elevated temperatures using a catalyst moved through the reaction space in amounts by volume larger than the amount by volume of initial material passed through the reaction space at the same time, the improvement which comprises applying the catalyst in the form of a moving bed, separating the hydrocarbon oil feed stock into several fractions of different volatility, separately heating each fraction, leading the various fractions through the reaction space partly in countercurrent and partly in concurrent flow with respect to the moving catalyst bed, so that the relatively low boiling fractions and the catalyst bed are introduced close to the same end of the reaction space and moved in the same direction, while the relatively high boiling fractions are introduced together with a flushing gas close to the opposite end of the reaction space and led countercurrently to the stream of the catalyst and said low boiling fractions, and withdrawing the reaction products at an intermediate point of the reaction space.

4. A process according to claim 3 in which the amount by volume of catalyst passed through the reaction space is about 5 to 25 times the amount by volume of initial material passed at the same time through the reaction space.

5. In a process for pressure-hydrogenation of hydrocarbon oils at elevated temperatures using a catalyst moved through the reaction space in amounts by volume larger than the amount by volume of initial material passed through the reaction space at the same time, the improvement which comprises applying the catalyst in the form of a moving bed, separating the hydrocarbon oil feed stock into several fractions of different volatility, separately heating each fraction, leading the various fractions through the reaction space partly in countercurrent and partly in concurrent flow with respect to the moving catalyst bed, so that the relatively low boiling fractions and the catalyst bed are introduced close to the same end of the reaction space and moved in the same direction, while the relatively high boiling fractions are introduced together with a flushing gas close to the opposite end of the reaction space and led countercurrently to the stream of the catalyst and said low boiling fractions, and withdrawing the reaction products at an intermediate point of the reaction space.

6. A process according to claim 5 in which the amount by volume of catalyst passed through the reaction space is about 5 to 25 times the amount by volume of initial material passed at the same time through the reaction space.

KURT PETERS.